United States Patent Office 2,947,351
Patented Aug. 2, 1960

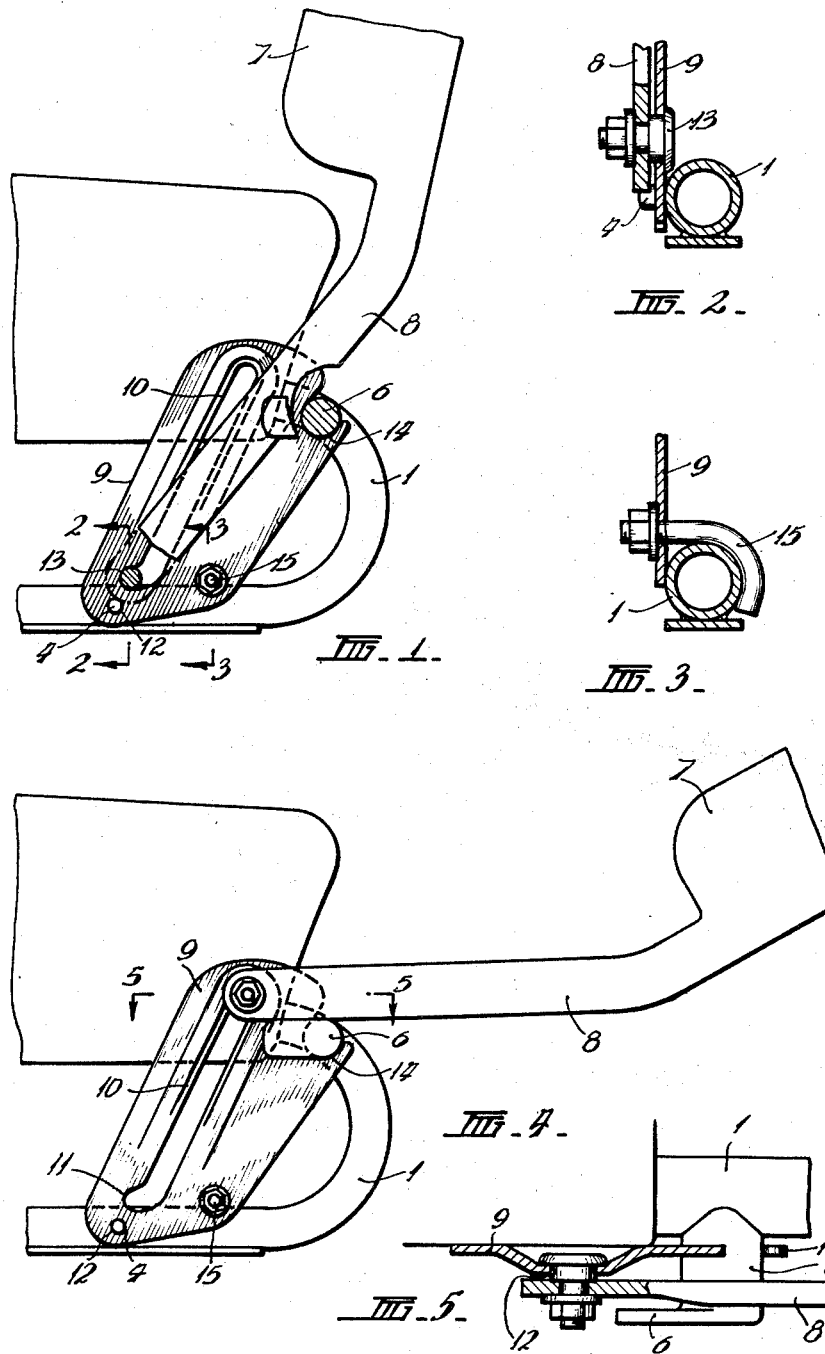

2,947,351

FITTINGS FOR AUTOMOBILE SEATS

Gerard C. MacIsaac, 26 Lansell Crescent, Camberwell, Victoria, Australia

Filed July 18, 1958, Ser. No. 749,406

4 Claims. (Cl. 155—160)

This invention relates to a device to facilitate the tilting back of the back rest of an automobile seat of the type in which the back rest is pivotally attached to the seat frame and is normally capable of pivoting forwardly of its normal position but not rearwardly thereof.

It is the object of this invention to provide a fitting which may be attached to automobile seats of the type referred to to enable the back rest, particularly of the front seat or seats, to be laid back to a position closer to the horizontal than is normally possible so as to provide a more comfortable resting or sleeping position and to provide such a device which may be operated without rearrangement of the position of the seat within the vehicle and without leaving the seat.

According to the invention there is provided a fitting, for use with an automobile seat of the type referred to, comprising a plate adapted to be fitted to the seat frame and provided with an upwardly extending slot to receive a pivot member provided on the back rest of the seat and in which the said pivot member may be moved upwardly to a position in which the back rest may be tilted rearwardly. Preferably the plate is dished in the area of the slot and the slot is provided, at its lower end, with a forwardly extending branch to accommodate the pivot pin when the back rest is in its normal position.

The application of the invention to a fitting for use on the front seats of a Volkswagen saloon motor car will now be described by way of example and with reference to the accompanying drawings.

In the accompanying drawings:

Figure 1 is a fragmentary side elevation of a car seat which has been provided with a fitting according to the invention, showing the back rest in the normal position, Figure 2 is a part section on the line 2—2 in Figure 1, Figure 3 is a part section on the line 3—3 in Figure 1, Figure 4 is a side elevation showing the back rest tilted rearwardly, and Figure 5 is a part section on the line 5—5 in Figure 4.

The front seats of such vehicles are mounted on tubular steel frames consisting of a pair of closed loops 1 fitted one to each side of the seat, the upper portion of the loop carrying the seat itself and the lower portion resting on guide rails attached to the floor of the vehicle. On each side of the seat the lower portion of the tubular steel loop is provided, at a position about two-thirds of the way along its length in the front to rear direction of the vehicle, with an outwardly projecting pin 4 and the upper portion of the loop 1 is provided near its rear end with an outwardly projecting abutment 6 which in later models is cam-like. The back rest 7 is provided on each side with a downwardly projecting tubular steel arm 8 having a hole in its free end adapted to be fitted over the pin 4. When the seat is in its normal position the backs of these arms 8 bear against the projections 6 and the back rest 7 is thus prevented from pivoting rearwardly of the normal position.

A fitting according to the invention, for use with such a vehicle, consists of a metal plate 9 provided with an upwardly and slightly rearwardly extending slot 10 having a forwardly extending branch 11 at its lower end, the plate being so dimensioned that when it is in position the top of the slot is higher than the projection 6 on the tubular steel frame. A hole 12 is drilled in the lower portion of plate so that it may be fitted over the outwardly projecting pin 4 on the lower portion of the seat frame. Into the holes in the lower ends of the downwardly extending arms of the back rest are inserted flat-headed bolts 13 which project inwardly and are adapted to be inserted into the slots 10 in the plates 9. The plate is dished in the area of the slots 10 so as to accommodate the heads of the bolts 13 and thus prevent damage to the upholstery of the vehicle and the upper rear edge of the plate is provided with a recess 14 to accommodate the projection 6. If desired, a forwardly extending branch may also be provided at the upper end of the slot to accommodate the bolt 13 when it is at the upper end of the slot and a rubber or like moulding may be placed around the edges of the plate 9 to protect the upholstery of the vehicle.

In use, a fitting of the type above described is affixed to each side of the seat and the two plates 9 are clamped in place on the seat frame by means of hook bolts 15 as shown in Figures 1 and 3. The rear edge of the upper portions of the plates 9 will, in this position, bear against the projection 6 and the plates are thus restrained from pivoting about the pin 4. The back rest is assembled within the plates 9 by springing the arms 8 apart, inserting the bolts 13 into the slots 10 and passing them through the holes in the ends of the arms. When thus assembled the upper portions of the plates 9 are caused to bear against the sides of the seat and are so restrained also against lateral displacement. In the normal position of the seat the bolts 13 on the arms 8 will be at the forward end of the forwardly extending branch 11, and the rear of the arms will be resting against the projections 6 on the upper portion of the seat frame 1. In order to recline the seat the back rest 7 is tilted slightly forwardly and lifted so as to bring the bolts 13 on the arms 8 out of the forwardly extending branch 11 into the upwardly extending part of the slot 10. The seat is then tilted rearwardly and lifted so that the bolts 13 move up the slot 10 until they reach its upper end. In this position the back rest 7 may be tilted rearwardly until the back of it rests against the front of the rear seat.

Fittings according to the invention may, of course, be provided on either or both of the front seats of the vehicle and it will be seen that they provide a relatively inexpensive means whereby the back rest may be tilted back to a reclining position. In addition they provide means whereby the lower end of the back rest may be kept at approximately the same level as the top of the seat rather than falling lower than this level as would be the case if the back rest were merely pivoted rearwardly about its normal pivot point. Thus there is provided a surface which more closely approximates the horizontal than would otherwise be the case.

The fitting particularly described above is given by way of example of the use of the invention on the seats of a Volkswagen motor car. It is to be understood, however, that the application of the invention is not limited thereby and that similar fittings embodying the invention may be adapted for use on seats of suitable type in other makes of vehicles. It is also to be understood that the invention is not to be limited by the precise form of the fitting above described and that other modifications and other adaptations may be made without departing from the spirit and scope of the invention as hereinbefore set forth.

I claim:

1. In combination with a seat having a pair of rigid frame members on each side thereof, each frame member having an upwardly extending rear portion, a pivot pin on a lower rear portion thereof, and a fixed projection on the upwardly extending portion, said seat having a back rest provided with a pair of depending arms apertured at their lower ends to releasably engage said pivot pins, and adapted to be supported by said projections, a fitting for each of said frame members comprising a plate having an aperture formed in a lower end thereof for removably receiving one of said pins, and being recessed at an upper rear portion to removably receive one of said projections, an upwardly extending slot defined in said plate having its upper portion terminating above said projection when the plate is thus mounted on a frame member, and a pivot member extending through each of the apertures in said arms into the slot in one of the fittings whereby the back rest may be disposed in a substantially upright position with the pivot members at the lower portions of said slots and said arms bearing against said projections, or in a substantially level position with the pivot members disposed at the uppermost portions of said slots and resting on said projections, selectively.

2. In combination with a seat having a pair of rigid frame members on each side thereof, each frame member having an upwardly extending rear portion, a pivot pin on a lower rear portion thereof, and a fixed projection on the upwardly extending portion, said seat having a back rest provided with a pair of depending arms apertured at their lower ends to releasably engage said pivot pins, and adapted to be supported by said projections, a fitting for each of said frame members comprising a plate having an aperture formed in a lower end thereof for removably receiving one of said pins, and being recessed at an upper rear portion to removably receive one of said projections, an upwardly extending slot defined in said plate having its upper portion terminating above said projection when the plate is thus mounted on a frame member, and a pivot member extending through each of the apertures in said arms into the slot in one of the fittings whereby the back rest may be disposed in a substantially upright position with the pivot members at the lower portions of said slots and said arms bearing against said projections, or in a substantially level position with the pivot members disposed at the uppermost portions of said slots and resting on said projections, selectively, said frame members having a tubular construction and said fitting plate carrying a downwardly turned bracket engaging over the lower portions of the frame members associated therewith.

3. In combination with a seat having a pair of rigid frame members on each side thereof, each frame member having an upwardly extending rear portion, a pivot pin on a lower rear portion thereof, and a fixed projection on the upwardly extending portion, said seat having a back rest provided with a pair of depending arms apertured at their lower ends to releasably engage said pivot pins, and adapted to be supported by said projections, a fitting for each of said frame members comprising a plate having an aperture formed in a lower end thereof for removably receiving one of said pins, and being recessed at an upper rear portion to removably receive one of said projections, an upwardly extending slot defined in said plate having its upper portion terminating above said projection when the plate is thus mounted on a frame member, and a pivot member extending through each of the apertures in said arms into the slot in one of the fittings whereby the back rest may be disposed in a substantially upright position with the pivot members at the lower portions of said slots and said arms bearing against said projections, or in a substantially level position with the pivot members disposed at the uppermost portions of said slots and resting on said projections, selectively.

4. In combination with a seat having a pair of rigid frame members on each side thereof, each frame member having an upwardly extending rear portion, a pivot pin on a lower rear portion thereof, and a fixed projection on the upwardly extending portion, said seat having a back rest provided with a pair of depending arms apertured at their lower ends to releasably engage said pivot pins, and adapted to be supported by said projections, a fitting for each of said frame members comprising a plate having an aperture formed in a lower end thereof for removably receiving one of said pins, and being recessed at an upper rear portion to removably receive one of said projections, an upwardly extending slot defined in said plate having its upper portion terminating above said projection when the plate is thus mounted on a frame member, and a pivot member extending through each of the apertures in said arms into the slot in one of the fittings whereby the back rest may be disposed in a substantially upright position with the pivot members at the lower portions of said slots and said arms bearing against said projections, or in a substantially level position with the pivot members disposed at the uppermost portions of said slots and resting on said projections, selectively, said arms being engageable on the outside of said plates and said pivot members comprising inwardly extending pivot studs dimensioned to be guided along said slots in close-fitting relationship.

References Cited in the file of this patent

UNITED STATES PATENTS

| | | |
|---|---|---|
| 1,100,919 | Seal | June 23, 1914 |
| 2,042,886 | Ferguson | June 2, 1936 |

FOREIGN PATENTS

| | | |
|---|---|---|
| 501,673 | Italy | Nov. 25, 1954 |